US012442136B2

(12) United States Patent
Lecuyer et al.

(10) Patent No.: US 12,442,136 B2
(45) Date of Patent: Oct. 14, 2025

(54) STUD FOR A DOCTOR BLADE HOLDER IN A FIBER WEB MACHINE AND DOCTOR BLADE ASSEMBLY FOR A FIBER WEB MACHINE

(71) Applicant: Valmet Technologies, Inc., Espoo (FI)

(72) Inventors: Stephane Lecuyer, Troi-Rivieres (CA); Jonathan Olszak, Beloit, WI (US)

(73) Assignee: Valmet Technologies, Inc., Espoo (FI)

( * ) Notice: Subject to any disclaimer, the term of this patent is extended or adjusted under 35 U.S.C. 154(b) by 168 days.

(21) Appl. No.: 18/370,961

(22) Filed: Sep. 21, 2023

(65) Prior Publication Data

US 2024/0102244 A1 Mar. 28, 2024

Related U.S. Application Data

(60) Provisional application No. 63/409,602, filed on Sep. 23, 2022.

(51) Int. Cl.
*D21G 3/00* (2006.01)
*B31F 1/14* (2006.01)

(52) U.S. Cl.
CPC ............... *D21G 3/005* (2013.01); *B31F 1/14* (2013.01); *B31F 1/145* (2013.01); *D21G 3/00* (2013.01)

(58) Field of Classification Search
None
See application file for complete search history.

(56) References Cited

U.S. PATENT DOCUMENTS 362,742 A * 5/1887 Hatch ...................... F16B 39/02 411/336
362,746 A * 5/1887 Hatch ..................... B26D 1/626 140/140
3,854,162 A * 12/1974 Russell .................. D21G 3/005 100/174
4,241,691 A * 12/1980 Hopfe ................... B05C 11/044 101/365
4,906,335 A * 3/1990 Goodnow .............. D21G 3/005 118/261
5,061,087 A * 10/1991 Roerig .................. F16C 23/045 384/419
(Continued)

FOREIGN PATENT DOCUMENTS

EP 0465224 A1 * 2/1991 ............. A63C 17/06
EP 4343060 A2 * 3/2024 ............. D21G 3/005
(Continued)

*Primary Examiner* — Anthony Calandra
(74) *Attorney, Agent, or Firm* — Stiennon & Stiennon

(57) ABSTRACT

A plurality of studs mount a doctor blade holder to a doctor back in a fiber web machine for slidable extraction of the doctor blade holder in the cross machine direction. Each stud (15) has a body (16) with a cylindrical center segment with a protruding nonround flange (17) formed as a single piece with the center segment. Opposed flats of the nonround flange of the body (16) may be engaged by the opposed parallel jaws of a conventional wrench allowing ready attachment of the studs to the doctor blade holder and subsequent installing within the channel of a rail which is mounted to the doctor back. A slide bar may be fixed to the doctor blade holder to extend out of the rail for engagement and extraction of the doctor blade holder.

19 Claims, 7 Drawing Sheets

(56) References Cited

U.S. PATENT DOCUMENTS

| | | | | | |
|---|---|---|---|---|---|
| 5,460,454 | A * | 10/1995 | Renoux | B60S 1/34 | 384/152 |
| 5,980,692 | A * | 11/1999 | Goodnow | D21G 3/005 | 118/261 |
| 6,202,252 | B1 * | 3/2001 | Harrisson | B31F 1/14 | 101/169 |
| 6,312,563 | B1 * | 11/2001 | Goodnow | D21G 3/005 | 15/256.51 |
| 2002/0153114 | A1 * | 10/2002 | Brauns | D21G 3/005 | 162/280 |
| 2006/0185812 | A1 * | 8/2006 | Rotherham | D21G 3/005 | 118/414 |

FOREIGN PATENT DOCUMENTS

| | | | | |
|---|---|---|---|---|
| FI | 116689 | B * | 1/2006 | D21G 3/005 |
| GB | 1198162 | A * | 7/1970 | D21G 3/005 |
| GB | 2265917 | A * | 10/1993 | D21G 3/005 |
| PL | 175790 | B1 * | 2/1999 | D21H 25/10 |
| WO | WO-9932746 | A1 * | 7/1999 | E05B 9/08 |
| WO | WO-2023095612 | A1 * | 6/2023 | F16C 29/005 |

* cited by examiner

STUD FOR A DOCTOR BLADE HOLDER IN A FIBER WEB MACHINE AND DOCTOR BLADE ASSEMBLY FOR A FIBER WEB MACHINE

CROSS REFERENCES TO RELATED APPLICATIONS

This application claims priority on U.S. Patent App. No. 63/409,602 filed Sep. 23, 2022, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a stud for a doctor blade holder in a fiber web machine, the stud having a body with a flange. The invention also relates to a doctor blade assembly for a fiber web machine.

In order to facilitate the maintenance of the doctor blade assembly, a doctor blade holder with sliding function has been developed. US-patent application number US20020153114A1 discloses such an assembly. Here the sliding function is implemented with a rail structure and multiple studs supporting the doctor blade holder and sliding inside the rail structure. In this way, the whole doctor blade holder can be slid out for maintenance. Similarly, the doctor blade holder can be slid in.

The height of the known doctor blade assembly is big. The high assembly needs space and increases forces straining the doctor blade holder and the studs. The known rail structure is of metal with fiberglass segments. The fiberglass is prone to cracking especially under impact loads, and it deteriorates over time. The stud itself has several parts and it requires the use of a special tool to install. This makes it difficult for maintenance when the tool is not available. The stud has rotating components which are weak. They will break off with time and when entering the rail structure, the sharp corners cause damage to the rotating elements. During use the studs will jam to the rail structure and it is hard to slide out the doctor blade holder.

SUMMARY OF THE INVENTION

It is an object of the invention to provide a novel stud for a doctor blade holder in a fiber web machine with easier exploitation and improved durability. Another object of the invention is to provide a novel doctor blade assembly for a fiber web machine which assembly is simple and compact but has rigid support for the doctor blade holder and can be utilized in various positions and with different doctor blade holders. The assembly can be made low, and it is easy to maintain. The stud and other parts of the assembly have unique properties. In this way, the doctor blade assembly functions accurately and is long lasting. With new kinds of parts, the doctor blade assembly remains simple but robust, and it is easy to slide in and out.

BRIEF DESCRIPTION OF THE DRAWINGS

The invention is described below in detail by referring to the enclosed drawings which illustrate some of the embodiments of the invention.

DESCRIPTION OF THE PREFERRED EMBODIMENTS

Figure 1:
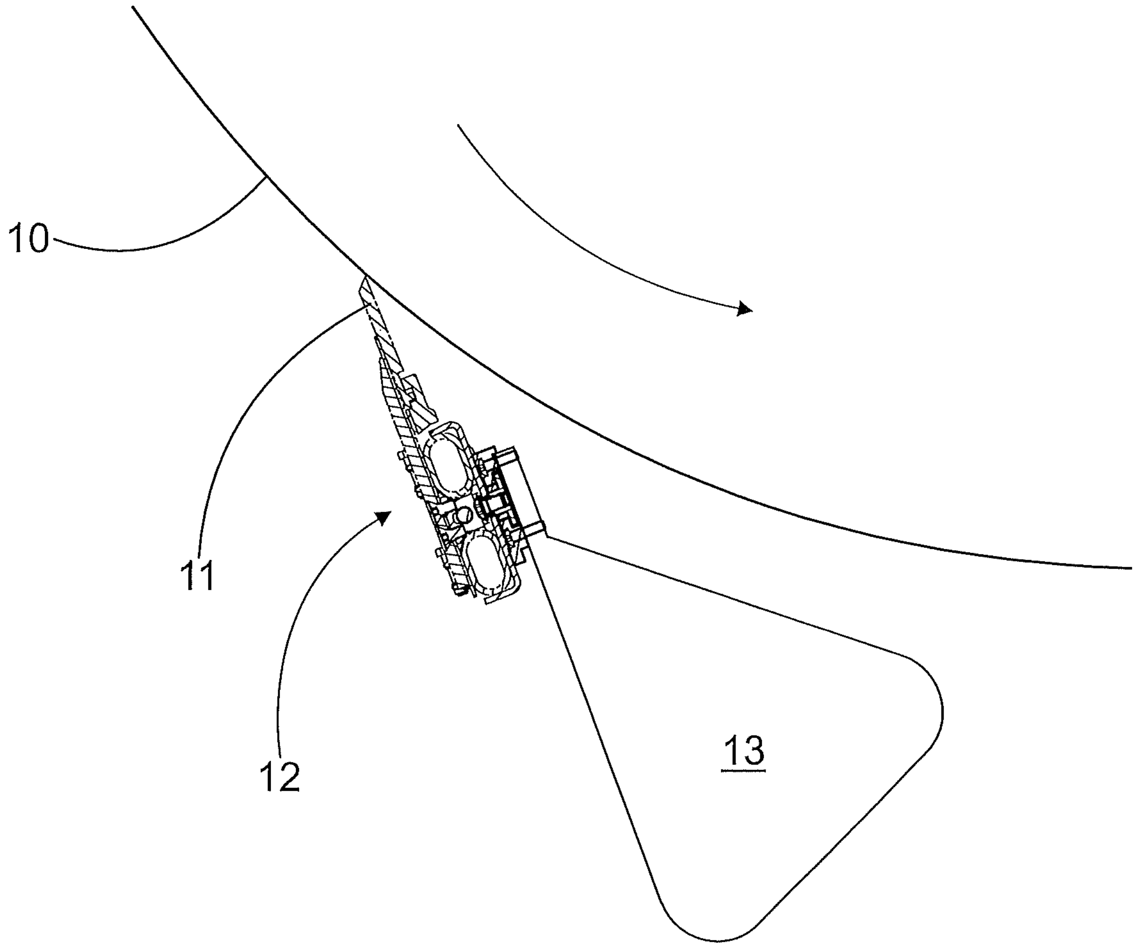
FIG. 1 shows a doctor assembly according to the invention adapted to the vicinity of a surface to be doctored.

FIG. 1 shows one doctor blade assembly according to the invention adapted to the vicinity of a surface 10 to be doctored. The doctor blade assembly is especially for fiber web machines such as paper, board, and tissue machines. Here one doctor blade 11 is arranged to a doctor blade holder 12 fixed to a doctor beam 13. Also other kinds of support structures for the doctor blade holder may be used and generally the support is called a doctor back. Here the surface 10 rotates counterclockwise. The surface can be, for example, the surface of a drying cylinder. Then the doctor blade keeps the surface clean. The doctor blade assembly is also suitable for doctoring polymer coated rolls, belts, and transfer belts as well as open-surfaced rolls. In a fiber web machine, such as a paper or board or tissue machine, open-surfaced rolls are used for several varied reasons. In a suction roll, for example, the shell is perforated for leading a vacuum effect from the inside of the roll to the outside of it. In other words, in the wet end of the machine, the doctored rolls have some void volume for water to escape. The void volume can be grooves, blind holes and/or through holes. Whereas in the dry end and finishing part of the machine most of the doctored rolls have a smooth surface. The holes make the shell open-surfaced. On the other hand, grooved rolls are also used, in which the shell surface is grooved mainly for improving dewatering. A suction roll with a grooved surface also exists, the shell of which is provided with both holes and grooves. In addition to or instead of grooves, blind bores, for example, can be used. Soft coatings are also used in the rolls while belts and transfer belts are soft surfaced by their nature. In addition, the surface of a belt, for example, can be grooved. The doctor blade removes water and impurities from the surface. Also, the doctor blade may remove the fiber web off the surface. In practice, in the center roll doctoring is crucial. So, there are may even be two consequent doctor blades at one roll.

Figure 2A:
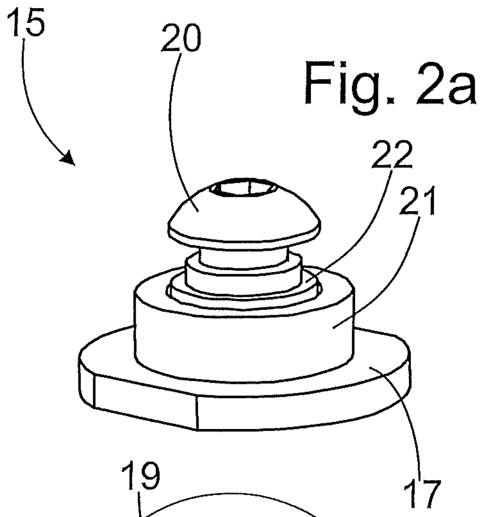
FIG. 2*a* is a perspective view of a stud according to the invention.

At its simplest, the doctor blade holder is attached to the doctor back with several screws. In the present invention, instead, a rail structure 14 is used together with studs. The rail structure 14 has a cross-machine direction channel 57 with an inverted T-shape. The channel is defined by two opposed lips 58 of the rail structure 14 which extend towards one another in the machine direction. Generally, the stud is for a doctor blade holder assembly in a fiber web machine. One stud 15 is shown in FIG. 2*a*.

Figure 2B:
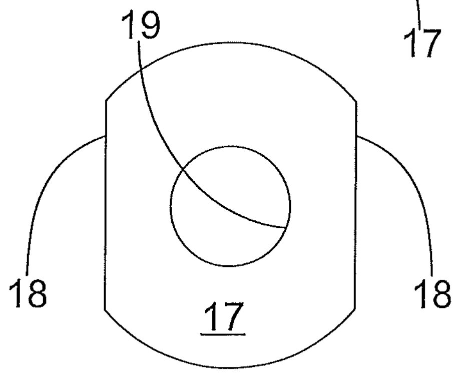
FIG. 2*b* is a plan view of the underside of the stud of FIG. 2*a*.

The stud 15 has a body 16 with a cylindrical center segment 55 with a lower flange 17 which extends outwardly therefrom for reception within the channel 57 beneath the lips 58. According to the invention, the body comprised of the center segment 55 and flange 17 is a single piece having a form for ready engagement by a standard tool having two opposed generally parallel jaws. Thus there are less parts, and the stud 15 may be easily installed and deinstalled with a standard tool. Here, the form of the non-round flange includes two opposite flats 18 arranged in the flange 17 (FIG. 2*b*). Thus the body can be held by a spanner (wrench) or adjustable spanner, for example. During installation, the stud 15 is positioned so that the flats 18 are mainly crosswise in relation to the rail structure 14 shown in FIGS. 4*a* and 4*b*. Thus the studs 15 will stay inside the rail structure with clearances as designed.

Figure 2C:
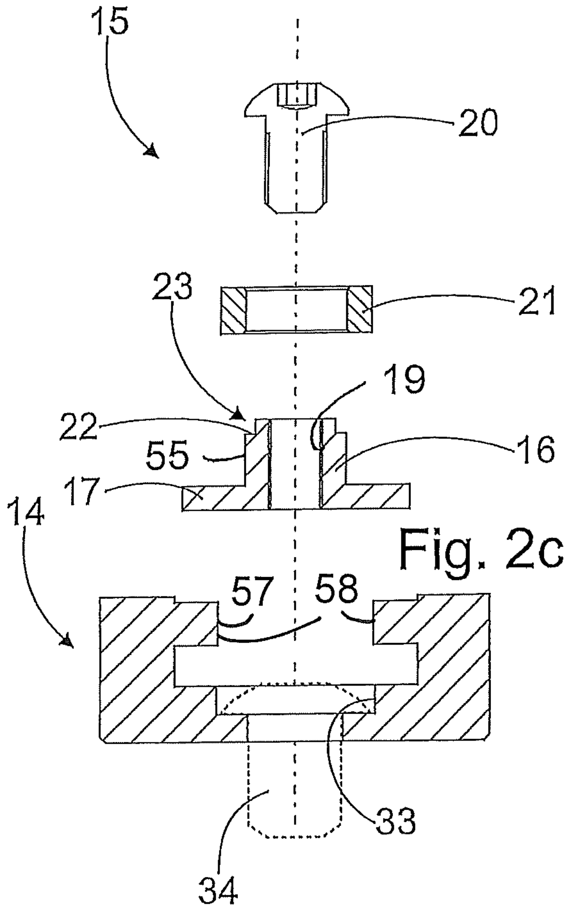
FIG. 2*c* is an exploded cross-sectional view of the parts of the stud of FIG. 2*a* together with one embodiment of a rail structure according to the invention.

The stud 15 in one piece is shown in FIG. 2*c*. As shown in FIG. 2*b*, the body 16 of the stud 15 has a threaded center boring 19 in its cylindrical center 55 with the flange 17 extending outwardly from the center, the flange having a circular shape with aforementioned opposed parallel planar flats 18 for assembly and disassembly using standard tools. The center boring 19 receives a machine screw 20 for attaching the doctor blade holder which is explained in more detail later. Even the plain stud 15 with the flange 17 would be enough to attach the doctor blade holder to the rail structure. However, there is also a rotating piece 21 arranged around the body 16. This rotating piece 21 will contact smoothly with the rail structure but simultaneously aid the sliding function. Advantageously, the rotating piece 21 is a tubular sleeve made of bronze or stainless steel. Then the stud 15 will have more durability and longer life than with the known studs. The body itself is of stainless steel 316, for example.

Figure 5:
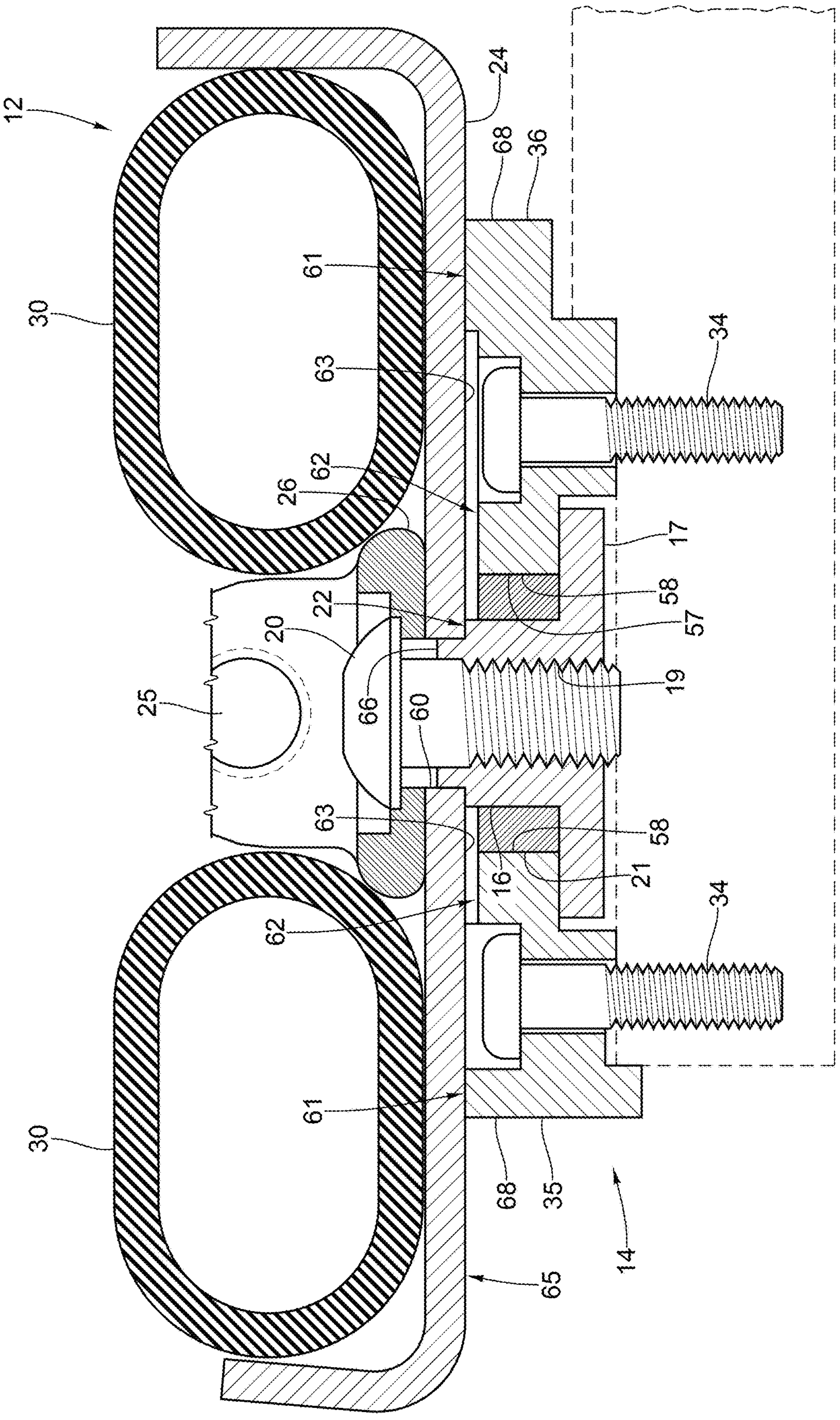
FIG. 5 shows an enlarged fragmentary view of the assembly of FIG. 3*b*.

The stud 15 will by aligned to the rail structure by aid of the flange and the rotating piece. So there are small clearances, and the vibrations of the doctor blade holder will be avoided. Here, the body 16 has a central section 66 protruding above a circumferential shoulder 22 at an end 23 opposite to the flange 17. A corresponding hole 60 is in the doctor blade holder, like in the tray or base plate 24 in FIGS. 3*a*, 3*b* and 5. Thus, the stud body 16 extends into the hole so that the shoulder 22 engages the underside 65 of the tray or base plate 24 so the stud will be firmly aligned with the doctor blade holder. As shown in FIG. 5, each rail part 35, 36 of the rail structure 14 has an outer member 68 having an upper surface 61 which engages the underside 65 of the tray or base plate 24 of the doctor blade holder. The rail parts 35, 36 have lips 58 which define the channel 57 therebetween. The upper portions of the lips 58 define upper surfaces 62 which are recessed below the rail part outer member 68 upper surfaces 61 and which extend along the channel 57 which receives the studs 15. Thus the lip upper surfaces 62 are spaced below the underside of the tray or base plate 24. The rotating piece 21 has a vertical height above the stud flange 17 which is less than the height of the shoulder 22 above the stud flange. The underside 65 of the tray or base plate 24 is engaged against the upper surfaces 61 of the rail parts and the shoulder 22 of the stud. Thus a gap 63 is defined between the rotating piece 21 and the tray or base plate 24 allowing the rotating piece 21 to rotate freely.

The doctor blade assembly is for a fiber web machine, and it has a doctor blade holder 12 arranged movable to a rail structure 14 with a plurality of consecutive studs 15 having a body 16 with a flange 17. With this kind of construction the whole doctor blade holder can be pulled out in a cross machine direction for maintenance and cleanup, for example. On the other hand, during installation, the rail structure is first attached to the doctor back or beam 13. Then the doctor blade holder equipped with studs is slid in to the rail structure in the cross machine direction. Advantageously, the majority of the studs are studs according to the present invention.

The modern doctor blade assembly includes a doctor blade holder 12 arranged pivotably by a pivot rod 25 supported to brackets 26. In this way, only the doctor blade holder pivots with the doctor blade. In the embodiment of FIG. 1, the doctor beam 13 is a rigid structure. The doctor beam 13 is supported at its ends and there are setting means for adjusting the angle of the doctor beam 13 (not shown). The actual loading of the doctor blade is done by pivoting the doctor blade holder. The doctor beam forms the doctor back.

Figure 3A:
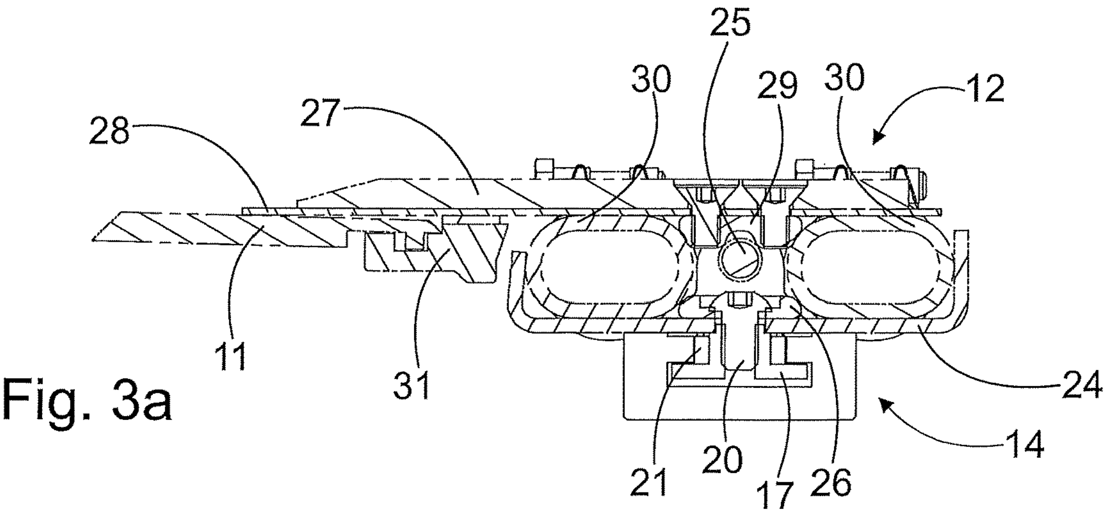
FIG. 3*a* is a cross-sectional view of one embodiment of the doctor blade assembly according to the invention.
Figure 3B:
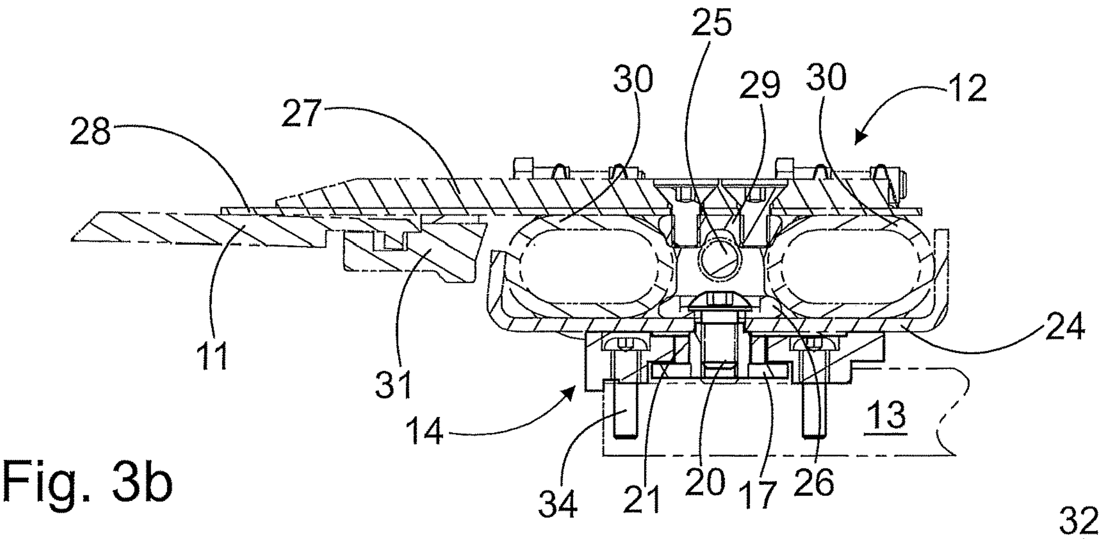
FIG. 3*b* is a cross sectional view of another embodiment of the doctor blade assembly according to the invention.

FIGS. 3*a* and 3*b* show the doctor blade assembly, where the doctor blade holder 12 also includes loading fingers 27, which are fixed to a top plate. Then there are top brackets 29 also fixed to the top plate 28. These top brackets are like the bracket 26 as bolted to the studs. There is also a pivot rod passed through both brackets. And more, between the studs 15 and the brackets 26 there is a base plate 24 holding two loading tubes 30 in place. Thus the top plate and the doctor blade installed thereto can pivot. By the loading tubes 30, the doctor blade is pressed against the surface or lifted up for maintenance. A jaw part 31 is also screwed to the top plate 28. The doctor blade 11 is supported by a blade holder 12, which includes a top plate 28 and a jaw part 31. Here the jaw part 31 is a separate piece screwed to the top plate 28. In other words, loading fingers are redundant.

Advantageously, the body 16 of the stud 15 has outer dimensions according to the rail structure 14. Especially, the distance between the shoulder 22 and the flange 17 is equal to the depth of the rail structure at the place of attachment (FIGS. 3*a*, 3*b* and 5). This eliminates movements in the vertical direction of the stud. Simultaneously, the diameter of the rotating element is equal to the rail structure in vertical direction. Thus the doctor blade holder will stay firmly supported without big gaps and any wiggling.

Figure 3C:
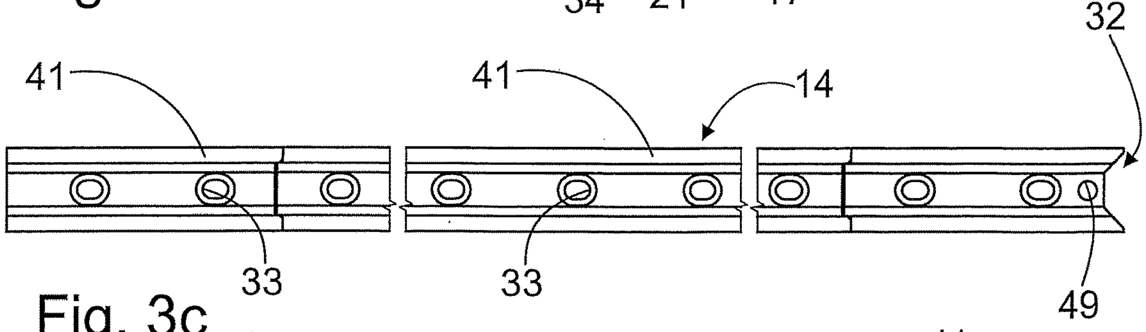
FIG. 3*c* is a top plan view of a rail structure according to the invention.

One rail structure 14 according to the invention is shown in FIG. 3*c*. Here, the rail structure 14 is of solid metal. The cross section of the rail structure 14 is shown in FIG. 2*c*. This kind of rail structure is also called a T-rail. Advantageously, bronze, or stainless steel is used for strength, durability, and long life.

Figure 4A:
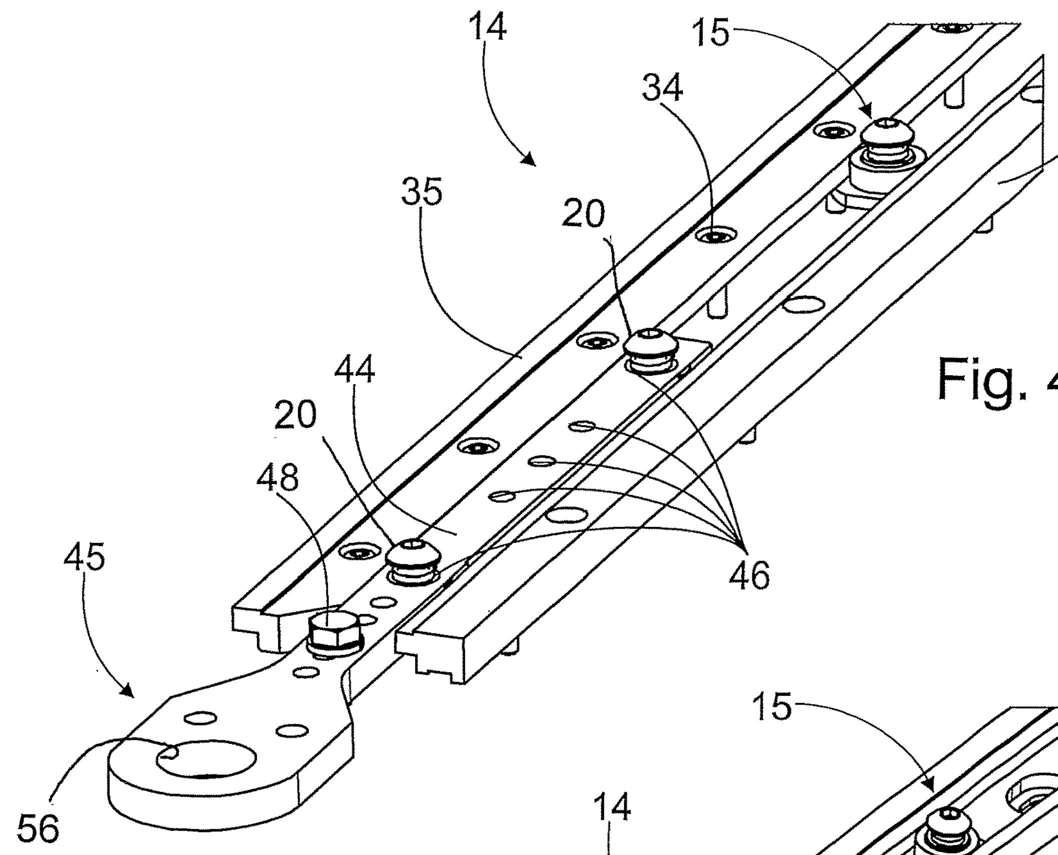
FIG. 4*a* is an axonometric view of the rail structure according to the invention equipped with a slide bar.
Figure 4B:
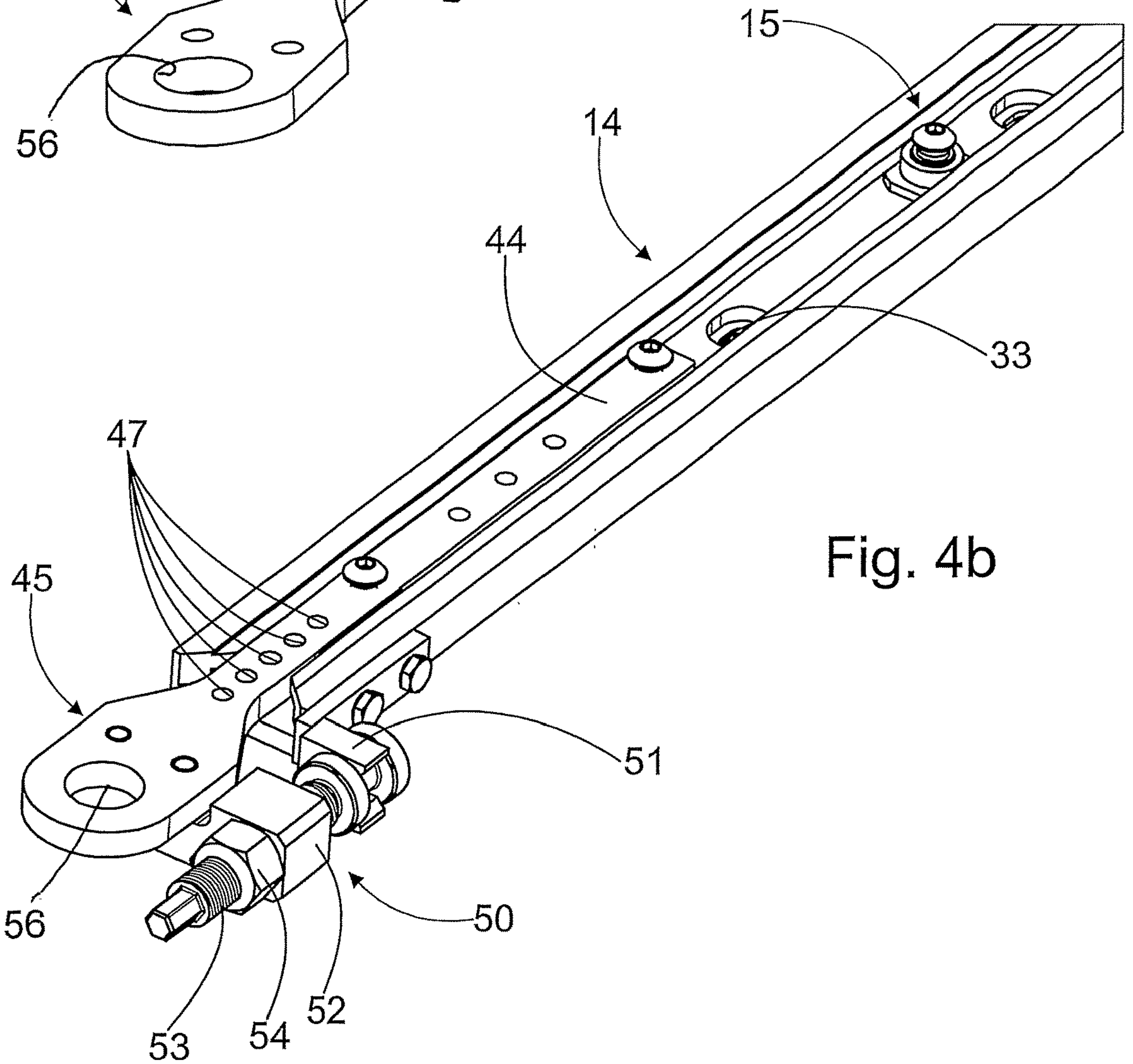
FIG. 4*b* shows another rail structure according to the invention equipped with the slide bar and a transfer equipment.

As shown in FIGS. 3*c* and 4*b*, the rail structure 14 has an entry area 32 with funnel shape. Sharp edges are thus avoided by bevels and rounded corners. This makes it easier to align the doctor blade holder for installation and prevents rotating piece damage. In the embodiment of FIG. 4*a* only the left side of the rail structure is beveled, which is enough for smooth operation.

The rail structure has even more new features. First, as shown in FIGS. 2*c* and 3*c*, the rail structure 14 has counter bored slots 33 for back bolts 34. With the back bolts the rail structure is attached the doctor back or beam 13. One back bolt 34 is shown in FIG. 2*c* with dotted line. These counter bored slots allow misalignment on the doctor back bolt pattern. In other words, the rail structure according to the invention can be easily installed to old doctor assemblies even if the holes for the back bolts are not precisely positioned in the cross-machine direction.

Figure 2D:
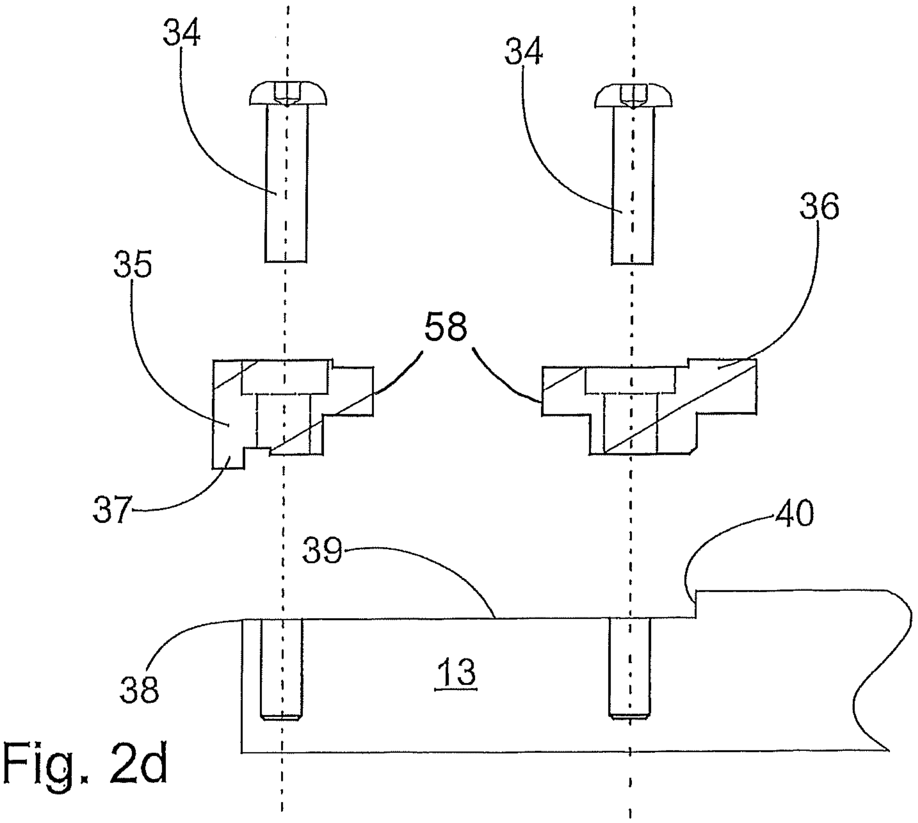
FIG. 2*d* is an exploded cross-sectional view of another embodiment of a rail structure according to the invention without the stud.

Also the rail structure itself has innovative design. Now the rail structure 14 includes two rail parts 35 and 36 arranged apart from each other. The cross sections of both parts are shown in FIG. 2*d*. With separate parts more back bolts are needed, but the height of the rail structure is much lower than previous. This reduces stresses targeting the studs. Also, the parts will be attached more firmly to the doctor back. In principle the parts could be identical which would simplify the manufacturing. However, advantageously one or both of the parts 35, 36 is installed on a doctor back 13 or doctor beam by form guiding. As shown in FIG. 2*d*, the left side part 35 has a protrusion 37 which bears to the tip 38 of the doctor back 13. The protrusion 37 will keep the part well aligned and straight when the back bolts are installed. Here the doctor back 13 has an accurate machining 39 forming an elevated edge 40 for the second part 36. Like the first part 35, the second part 36 is well aligned and straight when the back bolts 34 are installed. This kind of rail structure is well suited to new installations where the doctor back is made for the assembly according to the invention. On the other hand, an old doctor back may be machined if the assembly is rebuilt.

Figure 3D:
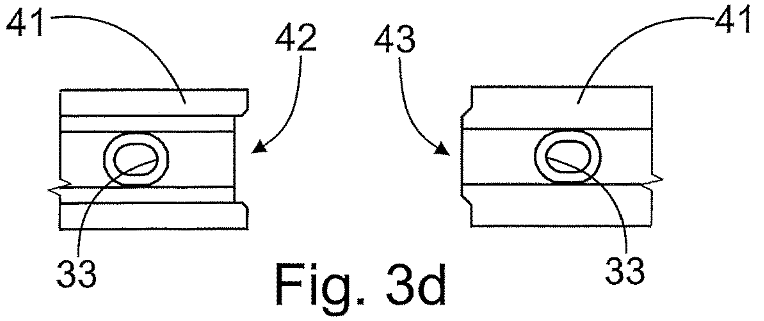
FIG. 3*d* is an enlarged exploded fragmentary of the rail structure of FIG. 3*c*.

As shown in FIG. 3*c*, the rail structure 14 is made up of several consecutive segments 41 with an interlocking design therebetween. Segments with one length may be manufactured and then as many segments are needed may be installed consecutively. If necessary, one or more segments are shortened to adjust to the total length. The interlocking design ensures accurate alignment of the segments when assembled. FIG. 3*d* shows one embodiment where on the left is a snick 42 and on the right is a corresponding notch 43. In the two-part rail structure this kind of design is not necessary, since the parts will be aligned by form guiding to the doctor back as explained above. Although, an interlocking design may be utilized.

In principle, there are studs over the length of the doctor blade holder. Thus the doctor blade holder is firmly supported. Advantageously, as shown in FIGS. 4*a* and 4*b*, at one end of the rail structure 14 instead of the studs 15 there is a slide bar 44 equipped with a handle 45 which extends outside the rail structure 14.

First, the slide 44 is dimensioned in view of the rail structure. So extra clearances are avoided, and the support remains also at the end of the doctor blade holder. Second, the handle 45 makes it possible to pull out the doctor blade holder by hand or using some pulling device. In FIGS. 4*a* and 4*b*, the slide bar 44 is mounted to the doctor blade 12 holder with two machine screws 20. Here, in addition, there are several holes 46 for attaching one kind of slide bar to any doctor blade holder model. Here the handle 45 is defined by a large hole in the end of the slide bar to allow for connecting heavy duty pull-out hardware such as a shackle or the like.

The slide bar has even more new features. The slide bar 44 has several consecutive holes 47 for a lock down bolt (not shown). In practice, the lock down bolt prevents the doctor blade holder from moving in the cross-machine direction while in operation. The drilled and tapped holes are on the end of the slide bar before the handle. This construction allows for more cross machine adjustment of the doctor blade holder. Here there are five holes 47 with equal intervals of about 12 mm. So the position of the doctor blade holder can be adjusted precisely in the cross-machine direction. As shown in FIG. 3, a threaded hole 49 at the end of the rail structure 14 to receive the lock down bolt extending through one of the selected consecutive holes 47 in the slide bar 44. Alternatively, a corresponding threaded hole may be provided on the doctor back in the embodiments like those shown in FIGS. 3*b* and 4*a*.

As shown in FIG. 4*b*, between the rail structure 14 and the slide bar 44 there is a transfer equipment 50. This transfer equipment is integrated into the slide bar and rail structure to facilitate initial sliding movement and fine tuning of the cross-machine position to allow the insertion of the lock down bolt. Here, a fork 51 is bolted to the rail structure 14. Then there is a threaded block 52 bolted to the slide bar 44. Between the fork 51 and the threaded block 52 is an adjustment screw 53 equipped with a lock nut 54. When uninstalling the doctor blade holder, the lock nut 54 is first released and then the adjustment screw 53 is rotated to move the doctor blade holder out. The transfer equipment pulls out even if the studs are jammed to the rail structure. When the doctor blade holder moves a little bit, it will be easy to pull out using the handle. Also, the transfer equipment can be used to adjust the doctor blade holder during the installation. The adjustment screw as well as the lock nut may be rotated with standard tools. Also, the transfer equipment can be installed on the other side of the rail structure.

The doctor blade 11 as well as the doctor assembly has a length of several meters, from 1 to 11 meters extending in the cross-machine direction. The doctor blade has a width from 5 to 20 centimeters extending in the machine direction.

The stud according to the invention is simple but robust. With the aid of other surprising features of the doctor blade holder, the installation and maintenance of the doctor blade assembly is easy and quick. At the same time, the doctor blade assembly is low in structure and is vibration-free. Also it is easy to maintain the doctor blade assembly, and it is suited for new installation and to retrofits.

We claim:

1. A stud for attachment to a doctor blade holder in a fiber web machine, for mounting the doctor blade holder within a rail fixed to a doctor beam, the rail extending in a cross-machine direction and having a cross-machine direction extending channel; the stud comprising:

a body having an upwardly extending central section with a threaded bore and an integrally formed flange which extends outwardly from the central section, the flange being non-round for engagement by a tool, the threaded bore being configured to receive a fastener extending into a portion of the doctor blade holder to retain the doctor blade holder to the stud, such that the stud retains the doctor blade holder to the rail when inserted within the rail channel; and a bronze cylindrical rotating piece disposed on the body to rotate about the central section.

2. The stud of claim 1, wherein the flange of the body comprises two opposite flats.

3. The stud of claim 1 wherein the body has a circumferential shoulder at an end opposite to the flange.

4. A doctor blade assembly for a fiber web machine, the assembly comprising:

a doctor blade holder and a rail structure with a plurality of consecutive studs, wherein the doctor blade holder is arranged movable to the rail structure with a plurality of consecutive studs having a body with a flange, wherein the majority of the studs are the studs of claim 1.

5. The assembly of claim 4 wherein the rail structure is comprised of solid metal of either bronze or stainless steel.

6. The assembly of claim 4 wherein the rail structure has an entry area with a funnel shape.

7. The assembly of claim 4 wherein the rail structure has counter bored slots which receive therein back bolts which secure the rail structure to a doctor back.

8. The assembly of claim 4 wherein the rail structure comprises two opposed rail parts spaced from one another in a machine direction perpendicular to the cross-machine direction.

9. The assembly according of claim 8, wherein one or both of the opposed rail parts have protrusions which align with portions of the doctor back during installation to thereby control the desired position of the opposed rail parts.

10. The assembly of claim 4, wherein the rail structure comprises a plurality of consecutive segments with interlocking structure therebetween.

11. A doctor blade assembly for a fiber web machine, the assembly comprising:

a doctor blade holder and a rail structure with a plurality of consecutive studs, wherein the doctor blade holder is arranged movable to the rail structure with a plurality of consecutive studs having a body with a flange, the rail structure for mounting the doctor blade holder within a rail fixed to a doctor beam, the rail structure extending in a cross-machine direction and having a cross-machine direction extending channel, wherein the majority of the studs comprise:

a body having an upwardly extending central section with a threaded bore and an integrally formed flange which extends outwardly from the central section, the flange being non-round for engagement by a tool, the threaded bore being configured to receive a fastener extending into a portion of the doctor blade holder to retain the doctor blade holder to the stud, such that the stud retains the doctor blade holder to the rail when inserted within the rail channel; and wherein at one end of the rail structure there is a slide bar equipped with a handle which extends outside the rail structure.

12. The assembly of claim 11, wherein the slide bar has several consecutive holes spaced from one another in the cross-machine direction and extending vertically and wherein a lock down bolt extends through one of the several consecutive holes to secure the cross-machine position of the doctor blade holder.

13. The assembly of claim 12, wherein between the rail structure and the slide bar there is a transfer equipment to facilitate initial sliding movement and fine tuning of a cross-machine position of the slide bar to allow the insertion of the lock down bolt.

14. The assembly of claim 13 wherein the transfer equipment comprises:

a fork fixed to the rail structure;

a threaded block fixed to the slide bar; and an adjustment screw extending between the fork and the threaded block and having a lock nut thereon.

15. An assembly for the removable mounting of a doctor blade to a doctor back within a fiber web machine, the assembly comprising:

a doctor blade holder having structure for retaining a doctor blade which extends in a cross-machine direction, the doctor blade holder having a plate with an underside and portions defining holes therein;

a rail structure for fixed mounting to the doctor back, the rail structure having two opposed rail parts with portions defining a channel which extends in the cross direction, the rail structure rail parts having opposed lips which extend towards one another in the machine direction into the channel, wherein each rail part has an upwardly protruding outer member positioned outwardly of the rail part's lip, each outer member having an upper surface which engages the plate underside, and each lip having a lip upper surface which is spaced below the upper surface of the rail part outer member;

a plurality of studs which connect the doctor blade holder to the rail structure and which extend downwardly into the channel of the rail structure, wherein each stud has a body with an upwardly extending central section with a top portion which extends into one of the plate holes, the central section having a threaded bore, wherein the top portion protrudes above a circumferential shoulder positioned above an integrally formed flange which extends outwardly from the central section, the flange being non-round for engagement by a tool, and a cylindrical rotating piece disposed on the body to rotate about the central section above the flange and between the lips of the rail structure, wherein the circumferential shoulder extends a first distance above the flange;

fasteners extending through the doctor blade holder plate holes into each of the threaded bores of the studs to fasten the doctor blade holder to the studs; and wherein each rotating piece has a vertical height above the stud flange which is less than the first distance, thus a gap is defined between the rotating piece and the underside of the plate allowing the rotating piece to rotate freely.

16. The assembly of claim 15, wherein each of the flanges of the studs comprises two opposite and parallel flats.

17. An assembly for the removable mounting of a doctor blade to a doctor back within a fiber web machine, the assembly comprising:

a doctor blade holder having structure for retaining a doctor blade which extends in a cross-machine direction;

a rail structure for fixed mounting to the doctor back, the rail structure having portions defining a channel which extends in the cross direction, the rail structure having two opposed lips which extend towards one another in the machine direction into the channel;

a plurality of studs fixed to the doctor blade holder and extending downwardly into the channel of the rail structure, wherein each stud has a body having an upwardly extending central section with a threaded bore and an integrally formed flange which extends outwardly from the central section, the flange being non-round for engagement by a tool, and a cylindrical rotating piece disposed on the body to rotate about the central section above the flange and between the lips of the rail structure;

fasteners extending through the doctor blade holder into each of the threaded bores of the studs to fasten the doctor blade holder to the studs; and a slide bar having a handle with a through hole extending vertically, the slide bar being fixed beneath the doctor blade holder and having portions which extend into the channel of the rail structure, the handle extending outwardly of the rail structure.

18. The assembly of claim 17, wherein the slide bar has several consecutive holes spaced from one another in the cross-machine direction and extending vertically and wherein a lock down bolt extends through one of the several consecutive holes to secure the cross-machine position of the doctor blade holder.

19. The assembly of claim 18, wherein between the rail structure and the slide bar there is a transfer equipment to facilitate initial sliding movement and fine tuning of a cross-machine position of the slide bar to allow the insertion of the lock down bolt, wherein the transfer equipment comprises:

a fork fixed to the rail structure;

a threaded block fixed to the slide bar; and an adjustment screw extending between the fork and the threaded block and having a lock nut thereon.

* * * * *